Patented Sept. 10, 1935

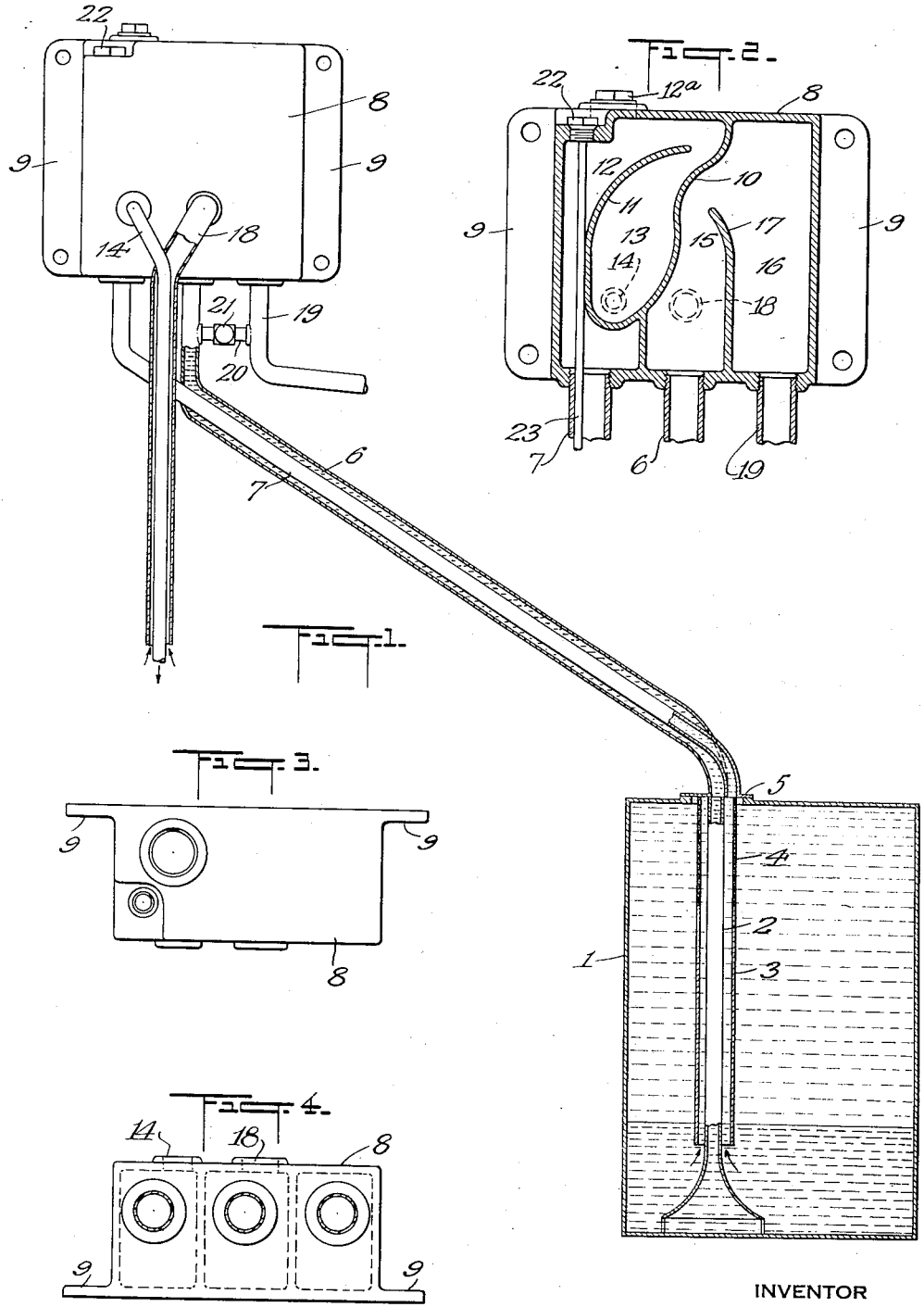

2,013,685

UNITED STATES PATENT OFFICE 2,013,685

ART OF HANDLING VOLATILE LIQUIDS

William Reed-Hill, Beechurst, N. Y.

Application May 9, 1932, Serial No. 610,294

3 Claims. (Cl. 158—50.2)

The handling of volatile liquids and particularly those liquids which form a vapor which in contact with air constitutes an explosive mixture, such for example as gasoline and oil, has always presented a problem. Much of the difficulty in handling such substances arises from their volatile character resulting in the formation of a vapor above a free surface. This formation of a vapor is not only conducive to a loss of the fluid passing into the vapor state but is extremely dangerous where the fluid is combustible, particularly where the free surface over which the vapor forms is in a closed container. In order to avoid this free surface and the attendant formation of a vapor in storage containers, for example, from which the fluid is drawn as needed, various attempts have been made to utilize what is frequently termed the hydraulic method of handling volatile liquids and it is to a system and method of handling volatile fluids hydraulically that my invention relates.

Essentially, a hydraulic method of handling volatile liquids consists in keeping the volatile liquid, at all times and under all conditions, pressed against the top of the tank by floating the volatile liquid upon another liquid of greater density. Thus, in the case of handling oil hydraulically, for example, the oil is floated upon water and the water is subjected to a head which is sufficient to maintain the oil pressed against the top of the tank irrespective of the quantity of oil in the tank or of a varying quantity. In this condition, the oil and water will not mix and there is of course no possibility of the formation of an explosive vapor within the container as it is free of air and there is no free surface from which a vapor may be formed. In addition to the safety attending the handling of volatile fluids in this way, there is also the advantage that the lines carrying the fluid from the container are always clean. Heretofore, however, it has been impossible to control the more dense or impelling fluid because in order to maintain the volatile fluid pressed against the top of the container at all times and irrespective of the quantity of volatile fluid in the container, it is necessary to have a head on the impelling fluid sufficient to raise it to the outlet for the volatile fluid. Consequently, the impelling fluid, upon emptying the container of the volatile fluid, flows into the volatile fluid lines which of course is objectionable.

In accordance with my invention, I provide a method and system for handling volatile fluids hydraulically in which the impelling fluid is under complete control. I utilize the difference in density between the volatile fluid being handled and the impelling fluid. I create a constant head upon the impelling fluid which is sufficient to keep the volatile fluid pressed against the top of the container at all times, and I provide an outlet for the volatile fluid above the level of the head on the impelling fluid. This is done in my system by providing a controller in which there is a means for maintaining a constant head upon the impelling fluid and a passage for the volatile fluid above the level of the head on the impelling fluid so that the impelling fluid cannot enter the volatile fluid line. The system also includes means for varying the head on the impelling fluid for filling the container with the volatile fluid and measuring the quantity of volatile fluid in the container.

Specifically, a system for carrying out my method of handling volatile fluids comprises a storage container for the volatile fluid and some form of controller for controlling the flow of the volatile fluid and the flow of the impelling fluid. In one form of my system, such for example as it is applied to a motor boat for handling the gasoline supplied to the motor, the storage container or gasoline tank may be any suitable container having a connection communicating with the lower end thereof and a connection communicating with the upper end thereof. These connections may be concentric or separate, the connection to the upper end of the container being for conveying a volatile fluid or gasoline to and from the container, and the connection to the lower end of the container being for conveying the impelling fluid or water into and out of the container. In this form of my system, the controller may consist of a container which is divided by a partition wall into two chambers. In each of the chambers, there is a baffle which divides the chambers into two compartments. One of the chambers is for the gasoline and the other is for the water. In the gasoline chamber, the baffle extends to a point near the upper wall of the chamber and forms with the dividing wall of the container a pocket-like compartment. The lower end of this chamber is connected to the upper end of the gasoline tank and is adapted to receive the gasoline which is forced upwardly from the gasoline tank by the water. As the gasoline fills the compartment which is connected to the gasoline tank, it overflows the upper edge of the baffle which forms with the upper wall of the chamber a passage from one compartment into the other. In the latter compartment, there is an outlet for the gasoline through which the gasoline may be delivered to the motor.

The baffle in the other chamber, which is the water chamber of the controller, does not extend to the same height as the baffle in the gasoline chamber. The water chamber, on one side of the baffle, is connected to a source of water supply which flows into the chamber and through an outlet that is connected to the lower end of the gasoline storage container into the gasoline storage container to act upon the gasoline and force the gasoline into the gasoline chamber of the controller. On the other side of the baffle, the water chamber is provided with a water discharge outlet through which water overflowing the baffle may pass. The height of the baffle within the water chamber determines the head placed upon the water or impelling fluid. In order to keep this head substantially constant with respect to the baffle in the gasoline chamber of the controller the edges of the two baffles are located substantially in the same plane so that tilting of the controller does not materially disturb the relation of the two baffles. Between the water connection extending from the lower end of the gasoline storage container and the inlet compartment of the water chamber of the controller and the outlet or overflow from the water chamber of the controller, there is provided a by-pass which includes a valve for controlling the by-passing of the water. By means of this by-pass, the water being supplied to the water chamber of the controller may be by-passed to the overflow at a lower level than that of the edge of the baffle separating the water chamber into compartments. In this way, the head upon the water may be decreased for the purposes of filling the gasoline storage container through the controller and also for gauging the quantity of gasoline remaining in the storage container. The height of the water baffle within the water chamber of the controller should be such that in accordance with the differences in densities of the impelling and volatile fluid, the head provided by this baffle will be such as to raise the volatile fluid when the storage tank is empty of volatile fluid to at least the top of the controller. Under the same conditions, the by-pass should be so located that the head impressed upon the impelling fluid when the by-pass valve is open is such that it will create a head upon the impelling fluid which will cause the volatile fluid to rise to the level of approximately the lower end of the controller. With this system it will be obvious that the impelling fluid will raise the volatile fluid over the baffle in the volatile fluid chamber of the controller and into the compartment formed by the baffle and the dividing wall of the controller and so to the outlet. When it is desired to fill the storage container with volatile fluid, the by-pass valve is opened and the volatile fluid may be entered into the volatile fluid chamber of the controller. As the volatile fluid enters this chamber it displaces the water through the by-pass until the gasoline storage container is filled.

It will be obvious that as the gasoline is utilized and the impelling fluid rises in the gasoline storage container, the impelling fluid in the storage container balances an equal head thereon. Consequently, it is the difference between the height of the impelling fluid in the storage container and the head on the impelling fluid which acts to raise the volatile fluid. Therefore, as the impelling fluid rises higher and higher in the gasoline container, the head on the volatile fluid diminishes accordingly. With the by-pass closed, however, this diminishing head is not sufficient to relieve the volatile fluid from being pressed against the top of the control chamber. However, with the by-pass open, the volatile fluid will rise to a lesser or greater extent in the volatile fluid chamber of the controller, depending upon the quantity of the impelling fluid in the storage container. Obviously, therefore, the level to which the volatile fluid rises in the controller with the by-pass open, is an indication of the quantity of gasoline in the storage container and any suitable form of gauge may be utilized to indicate this level, the gauge being graduated if desired into gallons. Any suitable level gauge would serve the purpose.

In the volatile fluid chamber of the controller, some air will be trapped between the top of the chamber and the volatile fluid. This air will be compressed by the head impressed on the fluid and will serve, upon releasing the head on the fluid, to prevent a syphon action from continuing the flow of fluid.

My invention will be more clearly understood from the following particular description of a unit suitable for a small motor boat which embodies my system for carrying out my method and which is illustrated in the accompanying drawing.

In the drawing:

Fig. 1 represents somewhat diagrammatically the connections between the storage tank and the controller;

Fig. 2 is a sectional elevation of the controller;

Fig. 3 is a plan of the same; and

Fig. 4 is an inverted plan of the controller.

Although I have illustrated my invention as it is applied to the gasoline system of a motor boat, it is to be understood that it is equally applicable to tankers and all forms of volatile fluid storage systems. In practice, systems for handling gasoline and oil may utilize water as an impelling fluid. Although water and oil are somewhat miscible under ordinary conditions, it is will known that they are immiscible in a fuel tank in which the oil is pressed against the top of the tank. In the drawing, there is illustrated a gasoline tank 1 in which there are a pair of concentric conduits 2 and 3, one extending to the bottom of the tank and being flared outwardly in the form of a bell and the other extending partially down the tank and having its upper end perforated as at 4. This construction is to permit one fluid to be entered into, and withdrawn from the tank at the bottom thereof, and another to be entered into, and withdrawn from the tank at the top thereof through the perforations in the exterior conduit 3, and any connections to the tank which will accomplish this purpose will be suitable. Both of these conduits extend through the cover 5 of a handhole through which access may be had to the interior of the tank. A system of baffling may be provided if desired about the outlet from the tank so that irrespective of the comparative quantities of the water and gasoline in the tank, any tilting of the tank will not be accompanied by water flowing into the exterior conduit which is for the purpose of supplying and discharging gasoline to and from the tank. The two conduits 2 and 3 are shown connected by concentric pipes 6 and 7 respectively to a controller 8.

The controller consists of a container which is much smaller in size than the gasoline tank and which may be mounted upon a panel, flanges 9 being provided for so mounting the controller. The interior of the controller is divided into two chambers—a gasoline chamber and a water chamber—by an irregular partition wall 10 transverse to the container. This irregular partition wall has a branch 11 which forms a baffle in the gasoline chamber dividing the gasoline chamber into two compartments 12 and 13, one of the compartments 13, that formed between the baffle and the partition wall, being in the form of a pocket. As will be observed from the drawing, the baffle 11, at its upper end, curves towards the partition wall and forms with the upper wall of the chamber a passage through which the two compartments of the chamber communicate. This chamber is provided with three openings through the walls thereof, one at the bottom thereof to which the gasoline pipe 7 leading from the top of the gasoline tank is connected, one at the top thereof through which gasoline may be supplied to the chamber from an external source of supply which is closed by a plug 12a, and one through the side wall communicating with the pocket-shaped compartment 13 which is connected to a pipe 14 leading to the carburetor of the motor which supplies power for propelling the boat.

The water chamber is likewise divided into two compartments 15 and 16 by a baffle 17. This baffle 17 is substantially straight with the exception that at its upper end it is curved towards the partition wall 10 which is also curved at this point to form a curved passage between the upper end of the baffle 17 and the partition wall 10. The upper end of the baffle 17 in the water chamber is curved towards the partition wall 10 so that its upper edge is substantially in the vertical plane of the upper edge of the baffle 11 in the gasoline chamber. By so placing the upper edges of the baffles 11 and 17 in approximately the same vertical plane, the relation of the baffles 11 and 17 are independent of any tilting of the boat and it is practically impossible, unless the boat is overturned, to raise the edge of the water baffle above the edge of the gasoline baffle, thus avoiding any possibility of the water level being raised sufficiently high to enter the compartment 13 of the gasoline chamber. The water compartment is also provided with three openings, two through the lower wall of the chamber, one on either side of the baffle, and an opening through the side wall of the chamber on one side of the baffle communicating with the compartment 15. One of the openings in the lower wall of the chamber, that adjacent the opening through the lower wall of the gasoline chamber and communicating with the compartment 15, is connected by means of the exterior pipe 6 of the two concentric pipes 6 and 7 and the conduit 2 to the lower end of the gasoline tank. The opening through the side wall of the chamber is connected through a pipe 18 to a source of water supply. This may be connected to the exhaust of the motor cooling system where water is taken over the side of the boat for cooling the motor and is discharged from the motor over the side after passing through the cooling system. The remaining outlet from the water chamber, the one communicating with compartment 16, is connected to a pipe 19 which extends over the side of the boat and may be termed an overflow conduit.

From the above description of the controller and gasoline tank and the connections between these two pieces of apparatus in the system disclosed, it will be apparent that water supplied to the compartment 15 of the water chamber from, for instance, the cooling system of the engine through the pipe 18, will pass downwardly along the pipe 6 to the bottom of the gasoline tank, and when this conduit is filled together with any available space in the gasoline tank, it will pass upwardly and over the baffle 17 into the compartment 16 of the water chamber of the controller. In this way a constant head, equal to the height of the baffle 17 in the controller, is impressed upon the water. The excess water over that required to maintain this head on the water passes over the baffle and through the overflow pipe 19. The density of water is of course greater than the density of gasoline so that a head on the water equal to the height of the baffle in the water chamber of the controller will move the gasoline to a level much higher than the top of the gasoline chamber of the controller. Consequently, any gasoline in the gasoline tank will be forced through the pipe 7, into the compartment 12 of the gasoline chamber of the controller, and over the upper edge of the baffle and into the compartment 13 communicating with the outlet to the engine. Also the gasoline will always be pressed against the top of the tank and the controller except for the aforementioned air cushion.

Between the water pipe 6 connecting the water chamber to the bottom of the gasoline tank and the overflow pipe 19, there is provided a by-pass 20 in which there is a control valve 21. This by-pass is preferably located at such a level with respect to the controller that the head on the water when the by-pass is opened will be just sufficient to raise the gasoline, when the gasoline tank is filled, to the top of the gasoline chamber of the controller. In this relation, the by-pass may be utilized when it is desired to fill the gasoline tank and for gauging the quantity of gasoline in the gasoline tank. Thus, if the gasoline tank is empty of gasoline and filled with water and the by-pass is opened, any gasoline in the line will drop to the bottom or below the bottom of the gasoline chamber of the controller in accordance with the decreased head on the water. As more gasoline is entered into the gasoline chamber of the controller through the opening in the top thereof, the head on the gasoline will be sufficient to raise the water above the level of the by-pass, thereby causing the water to pass through the by-pass and into the overflow and this condition continues until the gasoline tank becomes filled at which point the gasoline chamber of the controller is also filled. This relation which has been just described is due to the fact that as the water displaces the gasoline in the gasoline tank, a head of the water equivalent to the level of the water in the gasoline tank balances a portion of the total head on the water. The amount of the total head on the water balanced by the water in the gasoline tank of course varies with the level of the water in the gasoline tank and it is the difference between the two opposing heads on the water which acts upon the gasoline. Consequently, as the water level in the tank rises the head on the gasoline diminishes and in proportion to the difference in densities, the level to which the gasoline is raised is accordingly lessened. This condition is also utilized in the system of my invention for gauging the quantity of gasoline in the gasoline tank.

As seen in the drawing, the top of the controller is depressed at one corner forming a two-sided recess. Through the top of the container at this point, there is an opening into which a plug 22, having a rod 23 depending therefrom extends, the rod depending into the compartment 12 of the gasoline chamber of the controller. This rod is graduated and indicates, in accordance with the level of the gasoline in the gasoline chamber of the controller when the by-pass valve is open, the quantity of gasoline in the gasoline tank. When the relief or overflow valve 21 is open and the tank is full of gasoline, the gasoline is elevated to a position adjacent the top of the control chamber. Under the same conditions, when the tank is empty of gasoline, the gasoline is raised to a point just below the end of the rod 22. The tank holds a certain quantity of gasoline. The section of the rod between the two extreme points described, is divided in accordance with the capacity of the tank. Obviously, the rod may be graduated to indicate either the percentage of gasoline in the gasoline tank relative to a full tank or to indicate the number of gallons of gasoline in the tank. It is obvious of course that a gauge such as the usual water gauge used on boilers may also be utilized for this purpose, the gauge of course entering or communicating with the gasoline chamber of the controller at the two extreme points and, if desired, being graduated.

From the above description of the system as it is applied to a small motor-boat, the operation of the system will be obvious. The many advantages of the system herein disclosed will undoubtedly suggest themselves to those skilled in the art. Among the more important advantages of a system of this nature is the fact that it provides an absolutely safe system for the handling of fluids which form with air an explosive vapor. In the system disclosed, it will be apparent that there is no free surface of gasoline from which a vapor may rise and in addition there is no possibility of air coming in contact with the gasoline to form an explosive mixture. Another outstanding advantage of the system is the fact that all of the gasoline lines are kept flushed and there is no possibility of sediment entering these lines, as the sediment, if any enters the system, will be deposited on the bottom of the gasoline tank. These advantages, as will be apparent, are accompanied by the complete control of both the impelling fluid and the volatile fluid.

The various chambers and compartments in the controller should be so proportioned that a syphon action will not be set up to defeat the control for which the controller is designed. Thus, the compartment 16 and its outlet 19 should be of such a size, with respect to the rate of flow of water over the partition 17, that there will always be a break between the water in the compartments 15 and 16.

It is obvious that various forms of the controller and changes in the details of the system and steps of my method disclosed and described in detail above will suggest themselves to those skilled in the art within the principle and scope of my invention as expressed in the appended claims.

I claim:

1. A system for handling volatile liquid which comprises a storage container for the volatile liquid, a controller including a container having two chambers therein, a baffle in one of said chambers dividing the chamber into two compartments, the two compartments communicating with each other, means connecting one of said compartments with the upper end of the storage container, the casing of the controller having a discharge opening therein communicating with the other compartment, a baffle in the other chamber of the controller forming an overflow, the baffle in said second mentioned compartment being lower in elevation than the baffle in said first mentioned chamber, means connecting the second mentioned chamber on one side of the baffle to the lower end of the storage tank and to a supply of the impelling liquid, means for connecting the second mentioned chamber on the other side of the baffle to a discharge, and means for by-passing the supply of impelling liquid to the discharge connection.

2. A controller for a hydraulic system for handling volatile liquid comprising a container having a chamber for the volatile liquid and a chamber for the impelling liquid, each chamber having inlet and outlet connections, a baffle within the volatile liquid chamber dividing the chamber into two compartments, the edge of the baffle forming with the wall of the chamber a passage between the compartments, and a baffle within the impelling liquid chamber dividing the chamber into two compartments and constituting an overflow whereby the impelling liquid may flow from one compartment into the other, the edge of the baffle in the impelling liquid chamber being below the level of the edge of the baffle in the volatile liquid chamber.

3. A system for feeding a volatile liquid comprising a volatile liquid storage tank having connections at its top and at a point adjacent the bottom communicating with the interior thereof, a controller mounted above the top of the tank and having means therein forming a volatile liquid chamber comprising two compartments in communication at their tops at a point adjacent the top of the controller and an impelling liquid chamber comprising two compartments in communication at their tops at a point beneath said first mentioned point of communication, one of said volatile liquid compartments having an inlet connected to the top connection of said tank and a filler opening and the other compartment having a discharge outlet, one of said impelling compartments having an inlet and an outlet communicating with the connection adjacent the bottom of said tank and the other compartment having a discharge outlet.

WILLIAM REED-HILL.